(12) United States Patent
Hirashima et al.

(10) Patent No.: US 6,651,070 B1
(45) Date of Patent: Nov. 18, 2003

(54) CLIENT/SERVER DATABASE SYSTEM

(75) Inventors: Yoko Hirashima, Yokohama (JP); Satoshi Kikuchi, Yokohama (JP); Kenta Shiga, Yokohama (JP); Norihiko Kawakami, Fujisawa (JP); Toru Ohashi, Machida (JP)

(73) Assignee: Hitachi, Ltd., Tokyo (JP)

( * ) Notice: Subject to any disclaimer, the term of this patent is extended or adjusted under 35 U.S.C. 154(b) by 319 days.

(21) Appl. No.: 09/605,368

(22) Filed: Jun. 29, 2000

(30) Foreign Application Priority Data

Jun. 30, 1999 (JP) .......................... 11-184743
Dec. 16, 1999 (JP) .......................... 11-356971

(51) Int. Cl.$^7$ .............................................. G06F 17/30
(52) U.S. Cl. .................... 707/102; 707/10; 707/104.1
(58) Field of Search .............. 707/1–10, 100, 707/200, 102

(56) References Cited

U.S. PATENT DOCUMENTS 5,758,355 A * 5/1998 Buchanan .................. 707/201
5,987,472 A * 11/1999 Serafin .................... 707/104.1
6,073,140 A   6/2000 Morgan et al.

FOREIGN PATENT DOCUMENTS

JP           8202597       8/1996
JP          10187742       7/1998

* cited by examiner

Primary Examiner—Safet Metjahic
Assistant Examiner—Marcin Filipczyk
(74) Attorney, Agent, or Firm—Antonelli, Terry, Stout & Kraus, LLP

(57) ABSTRACT

A database link control method and apparatus capable of establishing a link between records related to each other and a database system including a database control function. The data base system includes a function for storing information regarding at least one record and a link relating records to each other holds at least one link generating information item necessary to generate a link to relate records to each other. The database system includes a database server including a storage to store information regarding at least one record and a storage to store links relating records to each other and a database client. The client holds at least one link generating information item necessary to generate a link to relate records to each other.

16 Claims, 11 Drawing Sheets

FIG.11

| COMMON ATTRIBUTE NAME (61) | UNIQUE ATTRIBUTE NAME (62) | CONVERSION RULE (63) |
|---|---|---|
| surname | nickname | InitChar<givenname>+,+<surname> =<nickname> |
| givenname | | |
| ⋮ | ⋮ | ⋮ |

FIG.12

| IDENTIFIER NAME (dn) (71) | CONVERSION SOURCE KEY ATTRIBUTE VALUE (72) |
|---|---|
| uid=0123,ou=Web,o=ABC | T.Yamada |
| uid=4567,ou=Web,o=ABC | S.Kikuchi |
| ⋮ | ⋮ |

CLIENT/SERVER DATABASE SYSTEM

CROSS-REFERENCE TO RELATED APPLICATIONS

This application is related to an application Ser. No. 09/605,359, filed Jun. 29, 2000, by K. Shiga et al. entitled DATA BASE SYSTEM AND DIRECTORY DATA STRUCTURE USED IN THE SAME.

BACKGROUND OF THE INVENTION

The present invention relates to a data base system including a plurality of information processing apparatuses connected to a network.

Data base systems have been broadly used, for example, in information systems of a firm, between firms, and of self-governing bodies or local governments to mange personal information and information of personnel affairs such as names and phone numbers as well as to manage parts in factories. One of the database systems employed to manage personal information and information of personnel affairs is a directory system to provide a directory service.

To achieve smooth communication in a firm and between firms, there has been recently adopted an electronic mail (e-mail) system in various fields to communicate via a network such as a local area network (LAN) documents produced by an information processing apparatus, for example, a personal computer (PC). In the e-mail system, the directory service representatively stipulated by X.500 (ISO9594) of the CCITT recommendations has been put to use as an electronic phone book to search a mail address of a receiver.

The directory service conforming to X.500 includes a data model hierarchically controlled in a directory tree. The model includes branches and leaves to which directory entry is allocated as a data unit corresponding to a record in a database. Each entry is specifically identified by a name including hierarchy information, i.e., a distinguished name (dn). The entry may contain a mail address of the user and various information items as attributes of the user such as a name, a phone number, a facsimile number, and a photo.

X.500 adopts a distributed system architecture of client-server type and stipulates a directory access protocol (DAP) in a seven-layer configuration of open systems interconnection (OSI) as a communication protocol between information processing apparatuses functioning as a client or a server. The Internet Engineering Task Force as an organization for standardization of the internet standardized a protocol between a directory client and a server on TCP/IP, i.e., Lightweight Directory Access Protocol (LDAP; RFC2251). From an application program on a client, the user accesses the directory server such as X.500 according to DAP or LDAP to search necessary information such as a mail address of a partner user. The DAP or LDAP further stipulates directory update requests including addition and deletion of an entry, change of an entry name, and update of an attribute value.

As described in page 258 of "Understanding X.500 The Directory" published from CHAPMAN&HALL, X.521 of the X.500 series recommendation stipulates object class groupOfNames and groupOfSpecificNames to classify entries into groups each including one or more entries. The disclosure of which is hereby incorporated by reference.

For each class, a member attribute is defined to hold an identifier name (dn) of another entry. The member attribute serves as a so-called pointer to indicate another entry. The group entry function makes it possible to classify users and other items registered to the directory server into groups according to various points of view. In the directory service, the group entry is used, for example, to set a directory access right to a plurality of users at a time.

In the information processing system of today, the information to specifically identify another object is called "link". In the directory service field, an identifier name indicating the object is used as information to specifically identify another object, i.e., as a link not only in the group entry but also, for example, in a meta-directory system. In a relational database (RDB), a name and/or a number which are/is as a primary key correspond/corresponds to the link.

A meta-directory system is a technique to integrally and centrally control, by the directory service, user information of various applications such as the e-mail in a firm. "DATAMATION" published on May 1, 1996 from DATAMATION describes specific products of the meta-directory system in pages 48 to 54. The disclosure of which is hereby incorporated by reference.

Ordinarily, user information required by respective applications can be classified into information such as a name to be shared with or common to other applications and information such as a mail box specific to the pertinent application. Therefore, for a user, information shared with other applications and information specific to an application of the user are registered to respective directory entries and these entries are related to each other by a link.

As above, although the link is useful to express various information in a database, it has been desired to easily maintain the links in consideration of the system operation and management.

SUMMARY OF THE INVENTION

It is therefore an object of the present invention to provide a database link control method capable of easily establishing a link between records related to each other and a database system including a database link control function according to the method. Another object of the present invention is to provide, in the database system, a database server and/or a database client and a program to achieve the server and the client.

According to the present invention, there is provided a database system including a function to store information regarding a plurality of records and a link to relate records to each other. The database system holds at least one link generating information item to generate a link to relate records to each other.

Desirably, the database system of the present invention includes a database server including first storage means for storing information regarding at least one record and second storage means for storing a link to relate records to each other and a database client. The database client holds at least one link generating information item to generate a link between the records.

In the configuration, when the system operation manager beforehand defines a correspondence between respective records and stores the correspondence in the holding means, it is possible to register at least one link to the server at a time. Consequently, the system installation and operation can be carried out with considerably reduced human labor.

In a directory system including a data base to store information regarding at least one record and a function to store a link to relate records to each other, the database system of the present invention holds at least one link generating information item to generate a link to relate records to each other.

In this configuration, when the system operation manager beforehand defines a correspondence between respective entries and stores the correspondence in the holding means, at least one link can be registered to the server at a time. This remarkably minimizes human labor necessary for the system installation and operation.

BRIEF DESCRIPTION OF THE DRAWINGS

The present invention will be more apparent from the following detailed description, when taken in conjunction with the accompanying drawings, in which:

FIG. 11 is a diagram showing an example of a link generating information table in another embodiment of the present invention;

FIG. 12 is a diagram showing a list for a link controller to generate links in another embodiment of the present invention.

DESCRIPTION OF THE EMBODIMENTS

Figure 1:
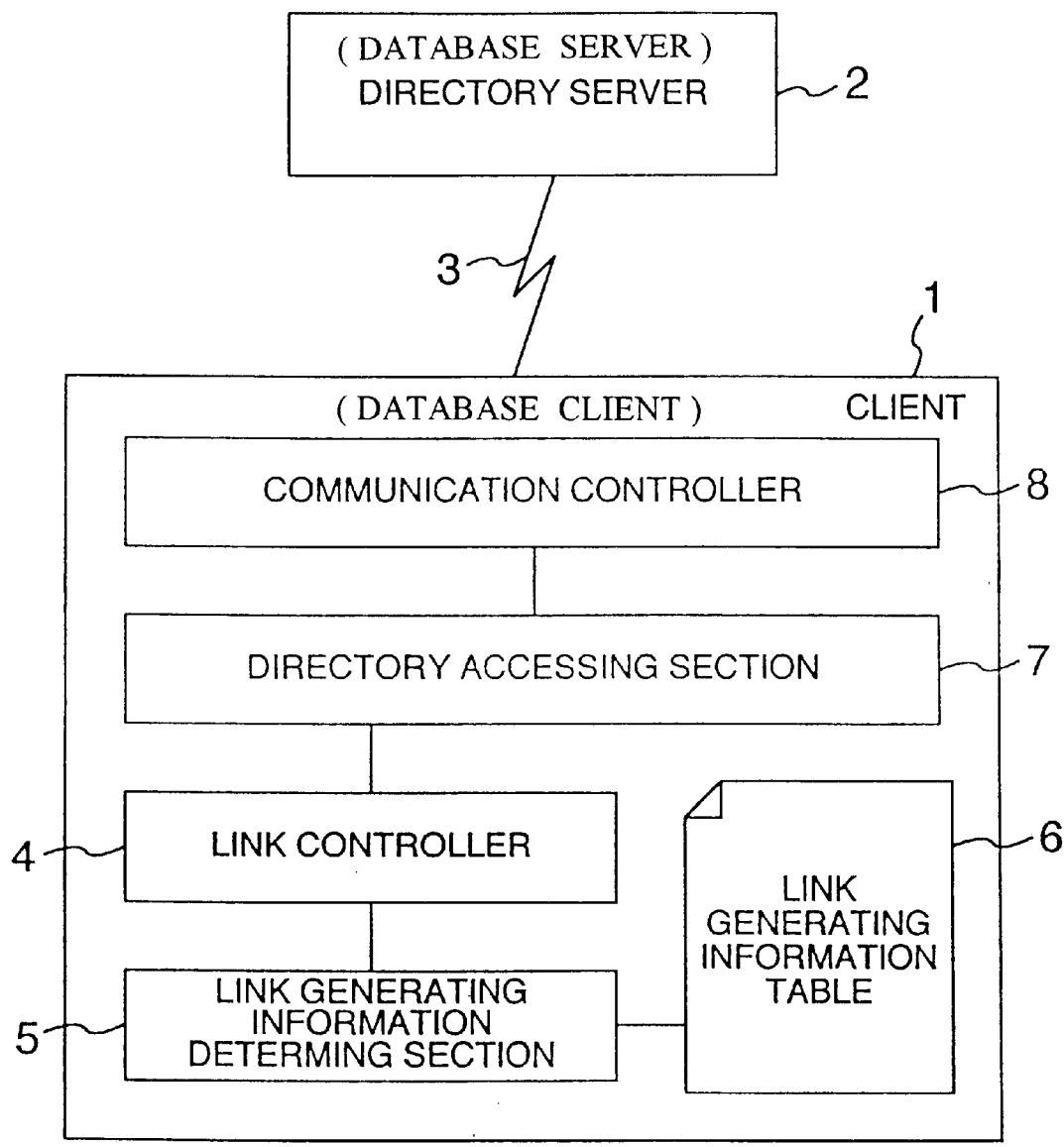
FIG. 1 is a block diagram showing constitution of a directory system according to the present invention.

Description will now be given of an embodiment of the present invention by referring to the drawings. In the drawings, the same constituent elements are assigned with the same reference numerals. In the description of each embodiment, the present invention is applied to a database in relation to a directory service. However, the present invention is applicable to various databases, for example, a relational database control system.

First, description will be given of a configuration of a database link control method according to the present invention.

FIG. 1 shows in a functional configuration diagram a directory system according to the present invention. This system includes a directory server 2, a directory client 1, and a network 3 such as an LAN to connect the server 2 and the client 1 to each other.

Client 1 includes a communication controller 8 to execute processing to communicate with server 2, a directory accessing section 7 to issue a directory access request such as a search access or an update access to server 2, a link generating information table 6 to which at least one link generating information item can be registered to establish a link between entries, a link generating information determining section 5 to control read and write operations of files, and a link controller 4. Link controller 4 reads information from link generating information table 6, generates a link between entries, and issues a directory update request to server 2. Controller 4 has also a function to read link information from server 2 so as to write the link information in table 6.

In the following description, file read and write operations of a link file are conducted via link generating information determining section 5 by link controller 4. Entry search and link registration are accomplished via directory accessing section 7 by link controller 4.

Figure 2:
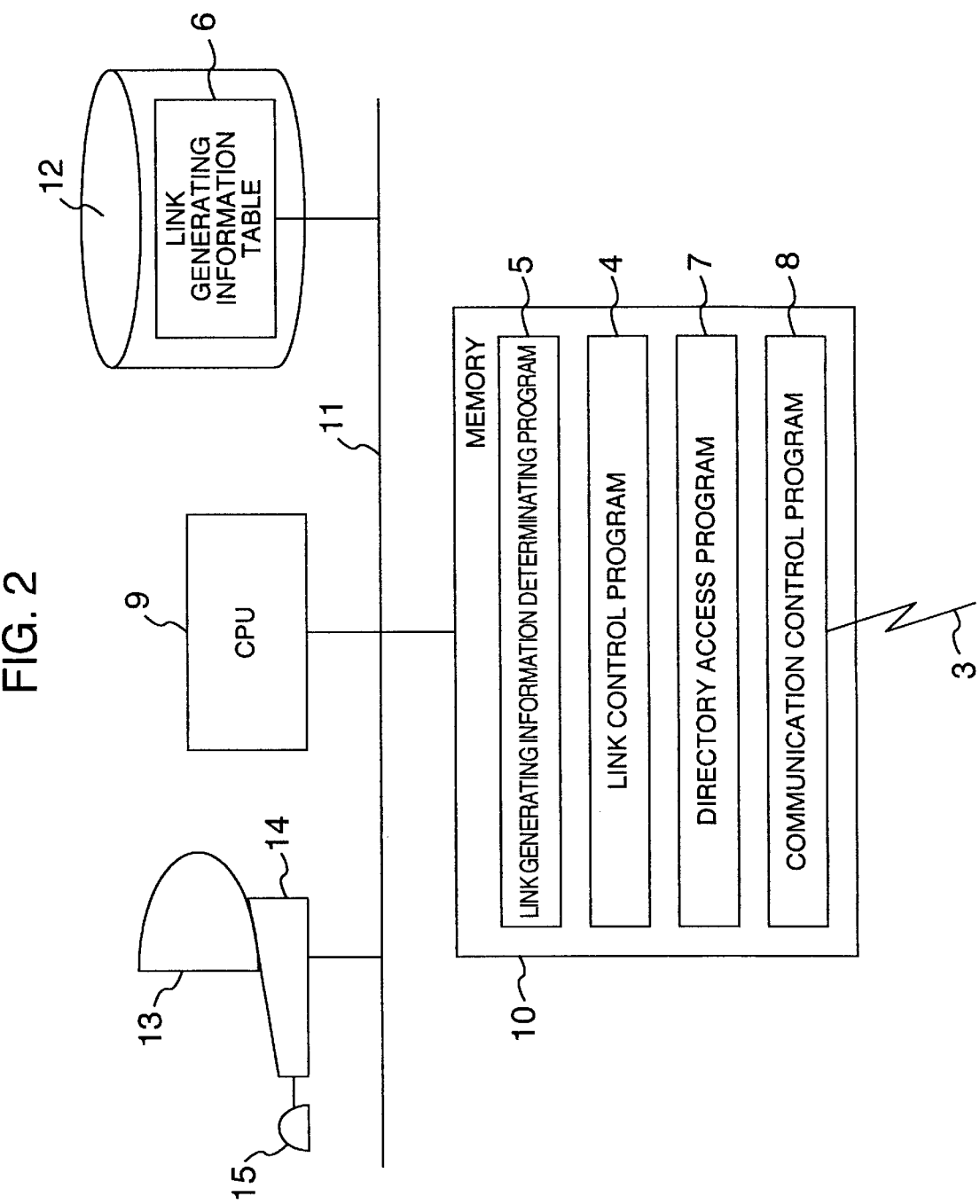
FIG. 2 is a diagram showing a system construction of a client according to the present invention.

FIG. 2 shows a system construction of client 1 in the embodiment.

Client 1 includes a central processing unit (CPU) 9, a magnetic disk 12 such as a hard disk drive (HDD), a main memory 10, a bus 11, a display 13, a keyboard 14, and a mouse 15. Main memory 10 stores a communication control program 8, a directory access program 7, a link control program 4, and a link generating information determining section 5.

These programs (modules, codes) are once stored on a magnetic disk 12. When necessary, the programs are transferred therefrom to main memory 10 to be executed by CPU 9. Link generating information table 6 is stored as a file on magnetic disk 12. These programs may be read from a portable recording media or may be downloaded from another computer via a network connected to the respective devices to be stored on magnetic disk 12.

Figure 3:
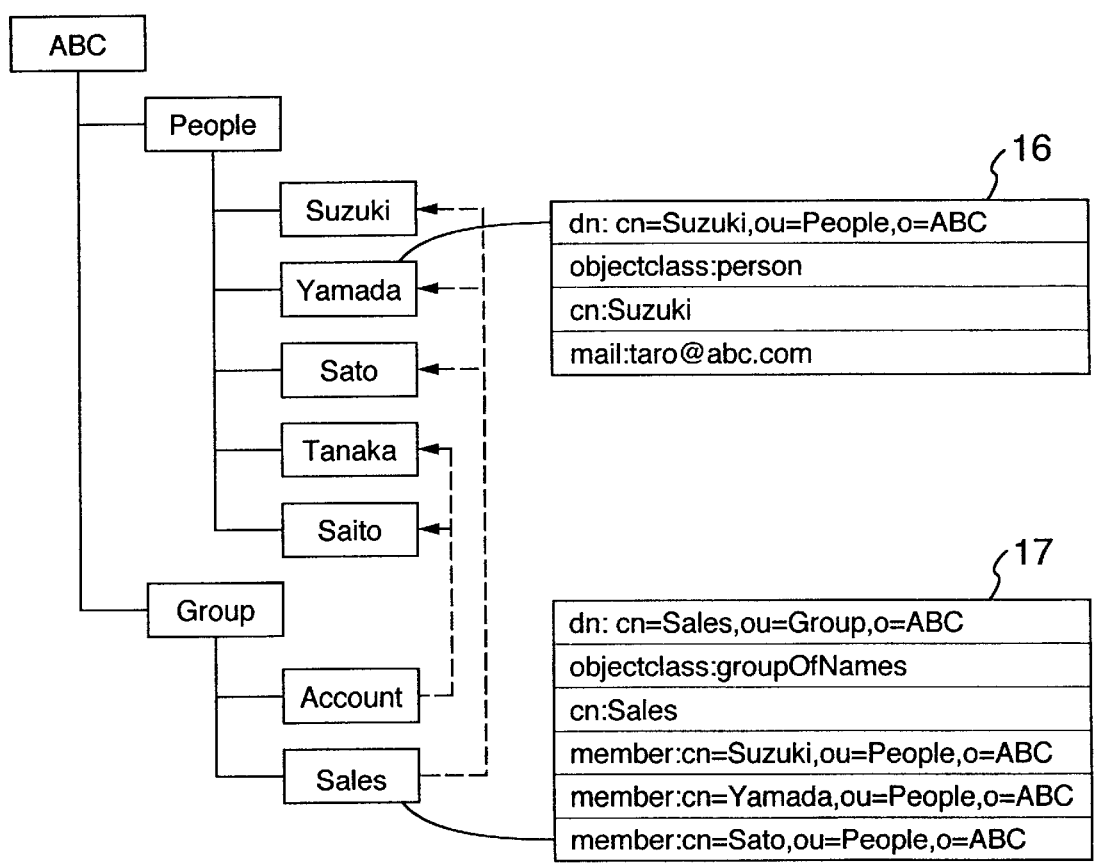
FIG. 3 is a diagram showing an example of directory information using a group entry.

FIG. 3 shows an example of layout of directory information using a group entry. This layout is of a tree structure and a rectangle represents a directory entry.

The layout includes entries 16 and 17 in the directory tree. Entry 16 has an object class of "person" and hence is recognized as a user entry. Entry 17 has an object class of "groupOfNames" and is therefore recognized as a group entry. User entry 16 includes as its attributes a common name (cn), a mail address (mail), and an entry identifier name (dn) of "cn=Suzuki, ou=people, o=ABC". Group entry 17 having an entry identifier name of "cn=Sales, ou=Group, o=ABC" includes three member attributes (member). Namely, three user entries registered to the member attribute belong to the group "Sales".

Figure 4:
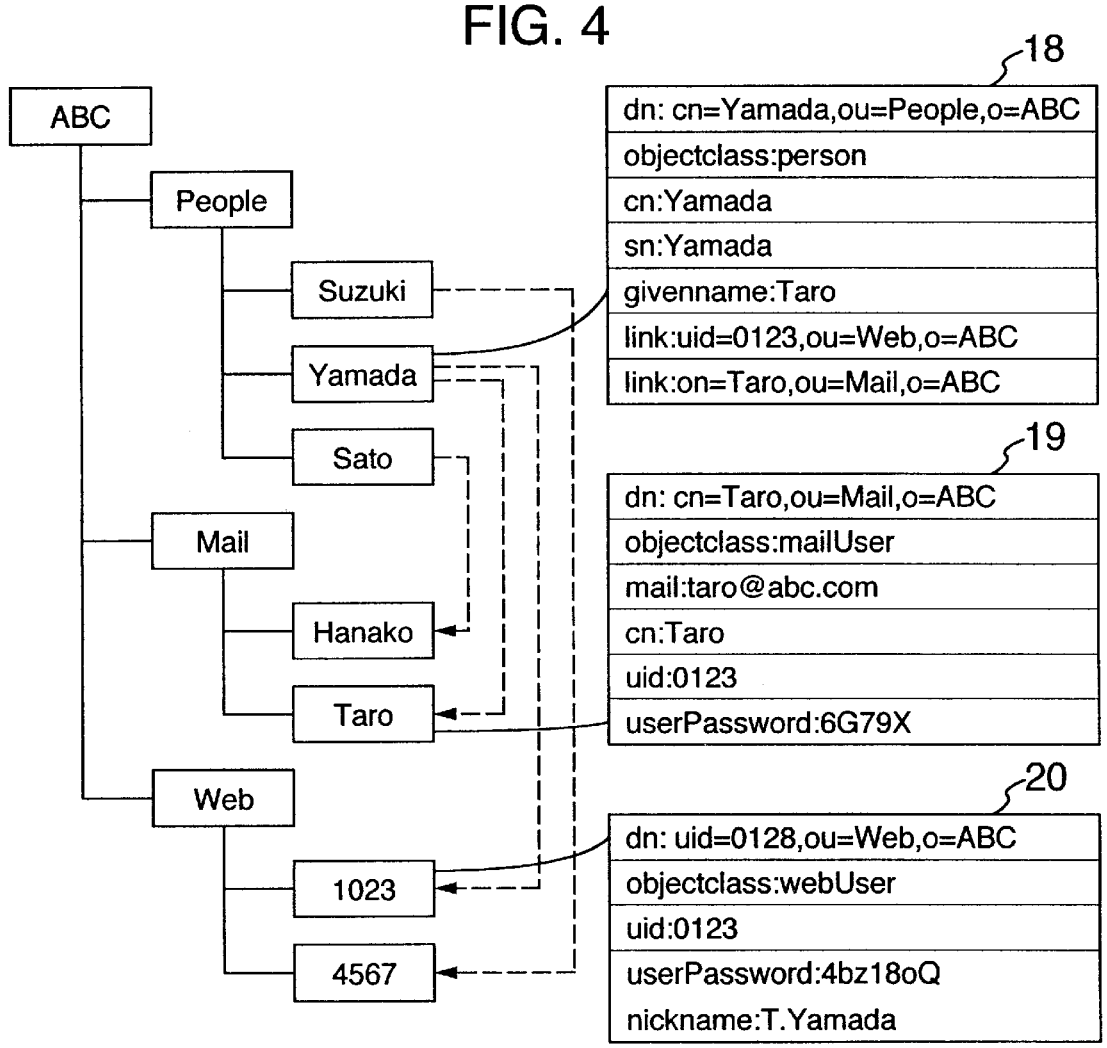
FIG. 4 is a diagram showing an example of directory information in a meta-directory system.

FIG. 4 shows an example of layout of directory information in a meta-directory system.

The layout includes entries 18 to 20. Entry 18 holds user information shared between applications (to be referred to as a common entry herebelow). Entries 19 and 20 hold user information specific to each application (to be referred to as specific entries herebelow). The common and specific entries are related to each other via a link attribute ("link" in common entry 18). Resultantly, it is possible to centrally control user information of various applications. When an attribute value is changed in either one of the common entry and the associated specific entry, if the other one has an attribute value to be changed, the pertinent change operation may be automatically and synchronously executed. In the synchronization, the meta-directory system searches the entry related to the entry changed and then changes the value of the entry to thereby reflect the change in the entry.

Description will now be given of a first embodiment of the present invention, namely, an all link generating function to generate links at a time using a database link control method of the present invention. The all link generating function is provided to automatically generate one or more links by a single operation of the system manager. This function facilitates the link control operation in a directory system storing a large number of entries.

Link generating information table 6 of the embodiment will be described by referring to FIG. 5. In this embodiment, the table is described in a comma-separated value (CSV) file format supported by applications circulated or available in the market such as "spreadsheet". In the CSV format to represent two-dimensional information on an ASCII file, a data string of one record is separated by a comma and a record is separated by changing a line. When data itself includes a comma in the description according to the CSV format, the data is enclosed by double quotes. To define two or more relations, each relation is described in one line. Link generating information table 6 includes a first line in which an attribute name of a link source and an attribute name of a link destination are described and subsequent lines in which specific attribute values to be compared and to be referenced to generate a link are described.

Figure 5:
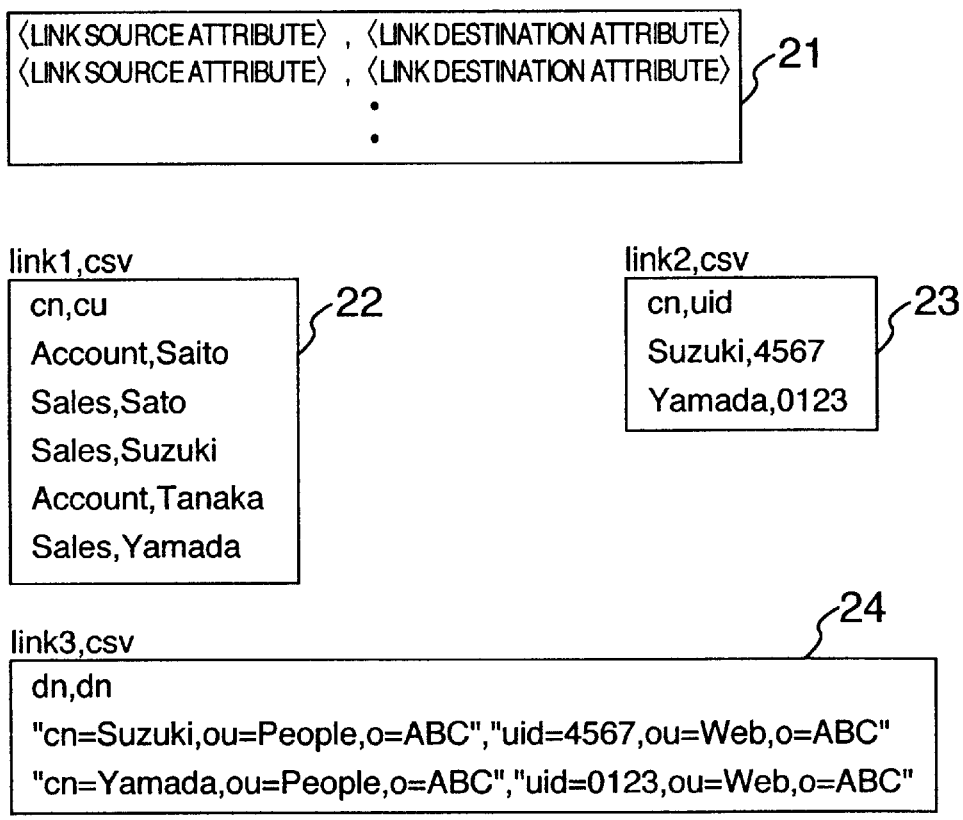
FIG. 5 is a diagram showing a format and an example of a link generating information table.

FIG. 5 further includes definition examples 22 to 24. Definition 22 defines a link generating information table 6 which is used to generate links at a time when the entries of FIG. 3 are already registered to server 2. For example, line 4 means that an entry to which a character string "Suzuki" is registered as the common name attribute (cn) is related to an entry to which a character string "Sales" is registered as the common name attribute (cn). Link controller 4 of this embodiment references the pertinent line of file 22 and then adds a member attribute (member) having a value of "cn=Suzuki, ou=People, o=ABC" to entry 17 to generate a link between entries 16 and 17. Namely, entries 16 and 17 are related to each other.

Definition 23 defines a link generating information table 6 which is used to generate links at a time when the entries of FIG. 4 are already registered to server 2. For example, line 3 indicates that an entry to which a character string "0123" is registered as a user ID attribute (uid) is related to an entry to which a character string "Yamada" is registered as the common name attribute (cn). Link controller 4 of this embodiment references this line of file 23 and then adds a link attribute (link) having a value of "uid=0123, ou=Web, o=ABC" to entry 18 to generate a link between entries 18 and 20. Namely, controller 4 relates the entries 18 and 20 to each other.

Description will now be given of an example of operation of a function to generate links at a time according to the present embodiment.

Figure 6:
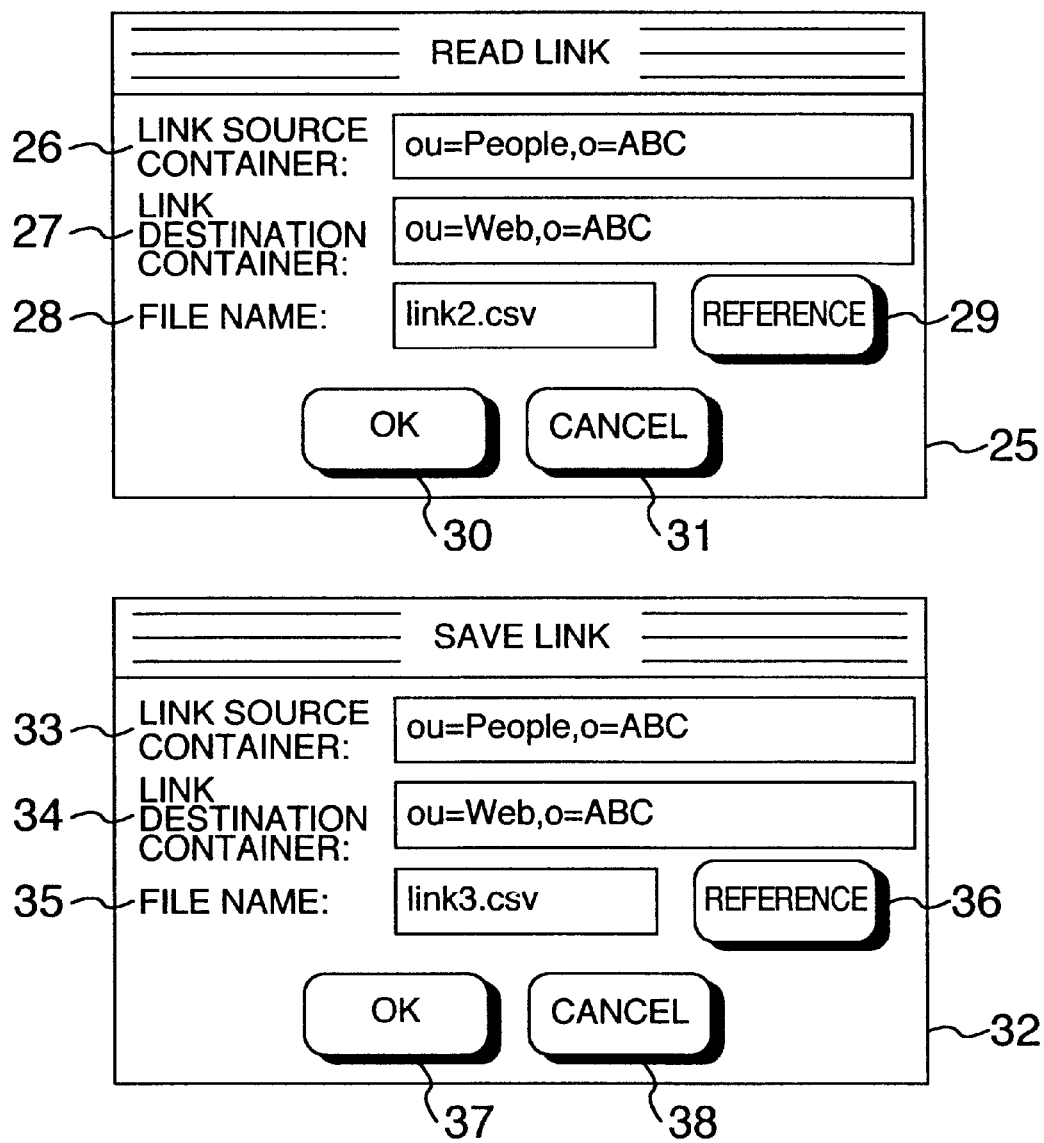
FIG. 6 is a diagram showing display screen examples in an operation to generate links and an operation to backup the link.

FIG. 6 shows an example of a display screen 25 to generate links at a time. The system manager sets parameters using display 13, keyboard 14, and/or mouse 15 of client 1. Screen 25 includes an area 26 to input an identifier name of a link source container, an area 27 to input an identifier name of a link destination container, an area 28 to input a name of a link generating information table 6 to be read, a button to display a list of various files stored on HDD 12, a button 30 to indicate an operation to generate all links at a time, and a button 31 to cancel the operation.

In this configuration, a container is an entry having at least one entry in the tree structure. For example, FIG. 4 includes a link source container having an identifier name "ou=people, o=ABC" and a link destination container having an identifier name of "ou=Mail, o=ABC" or "ou=Web, o=ABC". To generate all links at a time, the system manager inputs character strings in areas 26 to 28 from keyboard 14 or the like and then clicks OK button 30 using mouse 15.

Next, description will be given of operation of the function to generate all links at a time in the embodiment.

Figure 7:
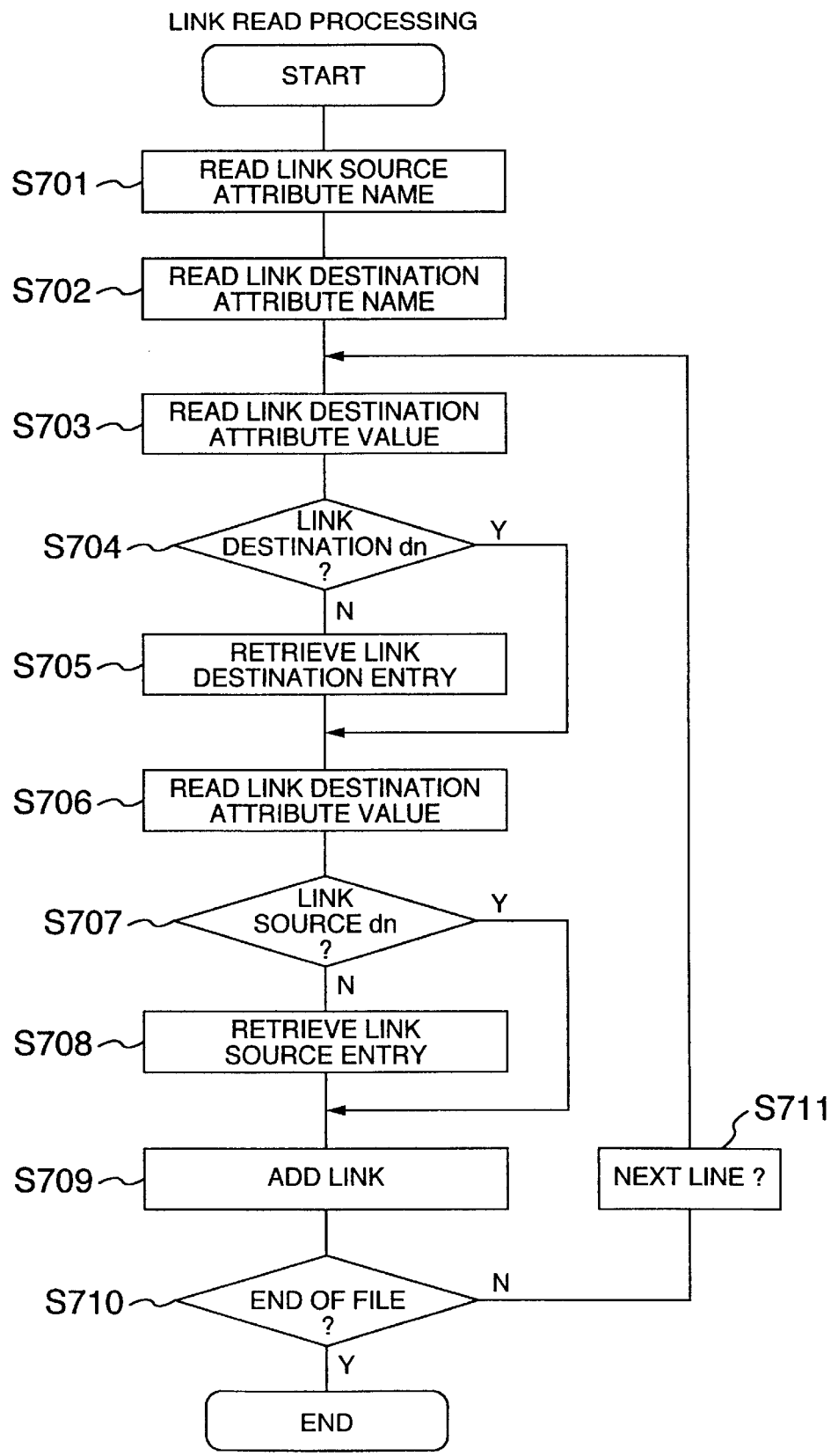
FIG. 7 is a flowchart showing a procedure to generate links at a time.

FIG. 7 shows in a flowchart operation of link controller 4 of the embodiment to generate all links at a time.

In steps S701 and S702, when the system manager clicks OK button on the screen 25, link controller 4 opens link generating information table 6 specified in area 28 and reads a link source attribute name and a link destination attribute name beginning at a first line of table 6.

Instep S703, a link destination is searched. Link controller 4 reads a subsequent line of table 6, extracts a link destination attribute value described after a comma. For entries having a lower hierarchic level with respect to the entry specified in area 27, link controller 4 generates a directory search request including link destination attribute values thus extracted and then issues the request to server 2.

When the link source or destination attribute defined in link generating information table 6 is dn, the entry can be determined only by the attribute value defined in table 6 and hence step S705 is skipped.

In step S705, server 2 analyzes the directory search request received and searches an entry satisfying the search range and condition. The server 2 returns an identifier name (dn) of the entry as a result of search to client 1.

In step S706, link controller 4 searches thereafter a link source entry. Link controller 4 extracts a link source attribute value described before a comma. For entries having a lower hierarchic level with respect to the entry specified in area 26, link controller 4 generates a directory search request including, as a search condition, link destination attribute values extracted and issues the request to server 2.

When the link source or destination attribute defined in link generating information table 6 is dn, the entry can be determined only by the attribute value defined in table 6 and hence step S708 is not executed.

In step S708, the link controller 4 executes search in the same way as for step S705.

In step S709, the link controller 4 having received a search result from server 2 generates an attribute item (a member attribute, a link attribute, or the like) for a link according to dn of the entry received in step S705 to generate an entry update request. Controller 4 then issues to server 2 the entry update request to add the pertinent attribute to the entry received in step S708.

In steps S710 and S711, link controller 4 repeatedly executes processing from step 703 to step 709 up to an end point of link generating information table 6 and then terminates the processing.

As above, in accordance with the present invention, the system manager need not set the link for each user information in the system installation and operation.

An analogous method is also considerable. Namely, entries equal in the attribute value to each other are searched and links are automatically established therebetween to relate the entries to each other. This resultantly minimizes maintenance of the links. For example, to automatically establish links between the entries in the example of directory information of FIG. 3, it is necessary to beforehand register an attribute having a value of "Sales" to each user entry 16. Similarly, in the directory information example of FIG. 4, it is necessary to beforehand register a user identifier attribute to common entry 18.

According to the directory link control method of the present invention, the system manager beforehand prepares link generating information table 6 in which a correspondence between the entries is described. Consequently, when the entries on server 2 have the same attribute value as well as when the entries have not the same attribute value, it is possible to automatically establish links between a large number of entries at a time.

In most cases, the system manager operating various information systems usually controls, by a familiar application such as "spreadsheet", the correspondence between the user names and the user identifier codes. Link generating information table 6 of this embodiment can be simply implemented in a file format widely adopted in applications circulated or available in the market in the CSV format or the like. This consequently leads to an advantage in which a file of existing spreadsheets being used by the system manager can be directly adopted as link generating information table 6.

In step S705 of the embodiment, if a plurality of entries are returned as search results from server 2, a plurality of links may be registered to the link source entry. Alternatively, either one of the links may be selected by the system manager.

Description will next be given of a link backup function using the directory link control method of the present invention.

A link generating information table 6 of this embodiment will be described by referring to FIG. 5.

Definition example 24 is a link generating information table 6 generated by a link backup function of this embodiment when the entries of FIG. 4 are beforehand registered to server 2 and links are already established therebetween. Items described in a first line indicate that the link source and destination entries have an attribute of dn. A third line indicates that "an entry having an identifier name (dn) of uid=1023, ou=Web, o=ABC is related to an entry having an identifier name (dn) of cn=Yamada, ou=People, o=ABC.

Description will now be given of an example of operation of the link backup function in this embodiment.

FIG. 6 includes a screen display example 32 in which link information is read from server 2 and is written in link generating information table 6. Screen 32 includes an area 33 to input an identifier name of a link source container, an area 34 to input an identifier name of a link destination container, an area 35 to input a name of a link generating information table 6, a button 36 to display a list of various files stored on HDD 12, a button 37 to indicate backup of links, and a button 38 to cancel the operation. To issue a link backup instruction, the system manager inputs character strings in areas 33 to 35 using keyboard 14 or the like and then clicks OK button 37 using mouse 15.

Subsequently, description will be given of operation of the link backup function in this embodiment.

Figure 8:
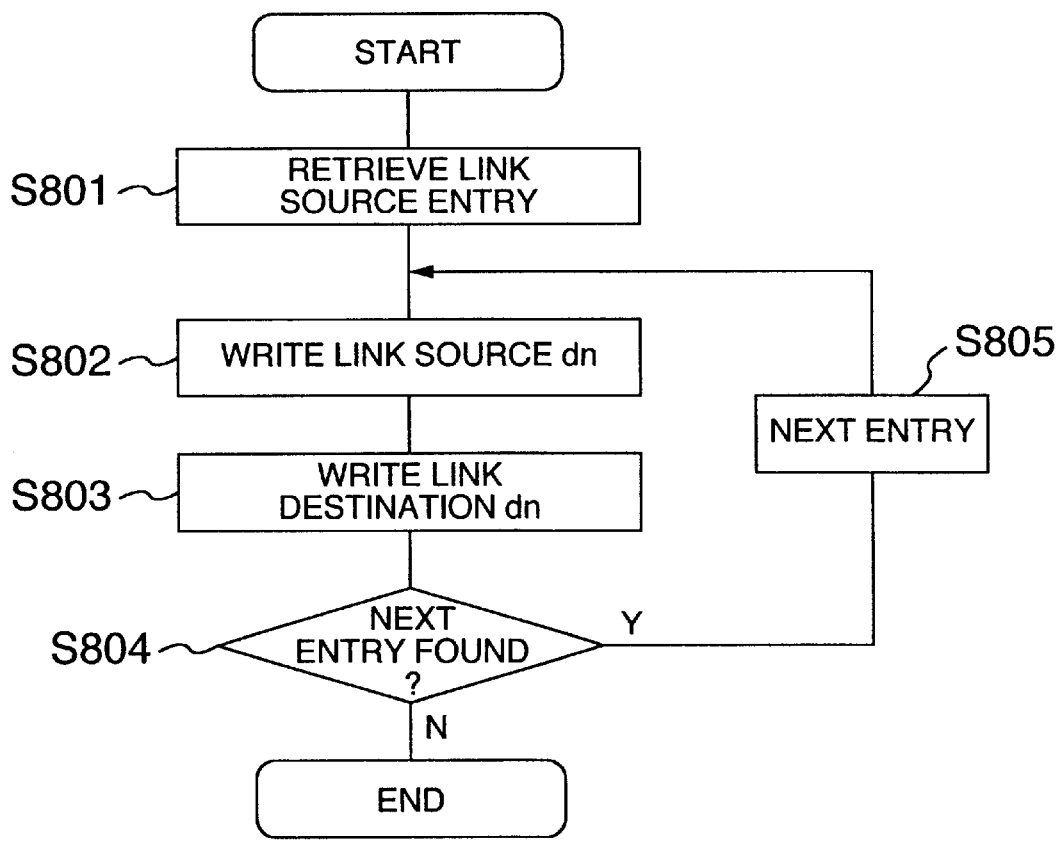
FIG. 8 is a flowchart showing a link backup procedure.

FIG. 8 shows in a flowchart operation of the link controller 4 to execute link backup processing in the embodiment.

In step S801, when the system manager clicks OK button 37 on screen 32, link controller 4 generates link generating information table 6 specified in area 35, writes attribute names (dn, dn) of link source and destination entries in a first line, and conducts search of a link source entry. For all entries below the entry specified in area 33, controller 4 generates a directory search request to acquire attribute items (a member attribute, a link attribute, or the like) for the link registered to each entry and then issues the request to server 2.

Having received the directory search request, server 2 analyzes the request and searches entries satisfying the search range and then returns to client 1 an identifier name (dn) detected and an attribute value requested.

In step S802, link controller 4 having received a search result from server 2 obtains a dn value from the received result and writes the value in link generating information table 6.

In step S803, controller 4 writes a comma thereafter. Controller 4 obtains an attribute value for a link from the result, writes the value in table 6, and feeds one line to start a new line.

In steps S804 and S805, having repeatedly executed steps S802 and S803 for all entries received in step S801, controller 4 terminates the processing.

In the meta-directory system, when directory information is updated, the update is reflected onto a database specific to the application to thereby retain integrity of information. However, at occurrence of a disaster such as a power failure or a failure in a hard disk device, there may take place mismatching between the information of the database specific to the application and the directory information. In this situation, it is necessary that the system manager once deletes all entries inherent to the application influenced by the disaster and then reconstructs the specific or inherent entries according to the database information specific to the application.

To facilitate maintenance of various links, there may be considered a function to guarantee integrity of links. For example, there may be employed a method (to be called an integrity function) in which when user entry 16 of FIG. 3 is deleted, the directory server searches all group entries to delete links indicating pertinent entry 16, namely, to delete member attributes to which dn of the deleted entry is registered. However, when this function operates at occurrence of the problem above, the inherent entries are deleted for the reconstruction and hence links indicating the pertinent entry are also deleted. Therefore, the system manager must again establish links between all common entries and the specific entries and hence the system restoration requires a long period of time and a considerable amount of human labor.

According to the database link control method of this embodiment, there can be provided a backup function to support link information already registered. If the backup operation is periodically conducted to save backup information including a link generating information table (e.g., example 24 of FIG. 5), the system can be quickly restored even at occurrence of a system failure. Namely, the links registered can be readily restored by executing the all links generating function using the link generating information table. Specifically, the problem that at occurrence of a problem of such a serious failure, the user entries are deleted by the integrity function and hence the member attributes cannot be kept remained can be solved.

It is assumed in the embodiments above that link generating information table 6 includes a first line defining the link source and destination attribute names. However, these attribute names may be inputted by the system manager when the links are generated at a time as shown in FIG. 9.

Figure 9:
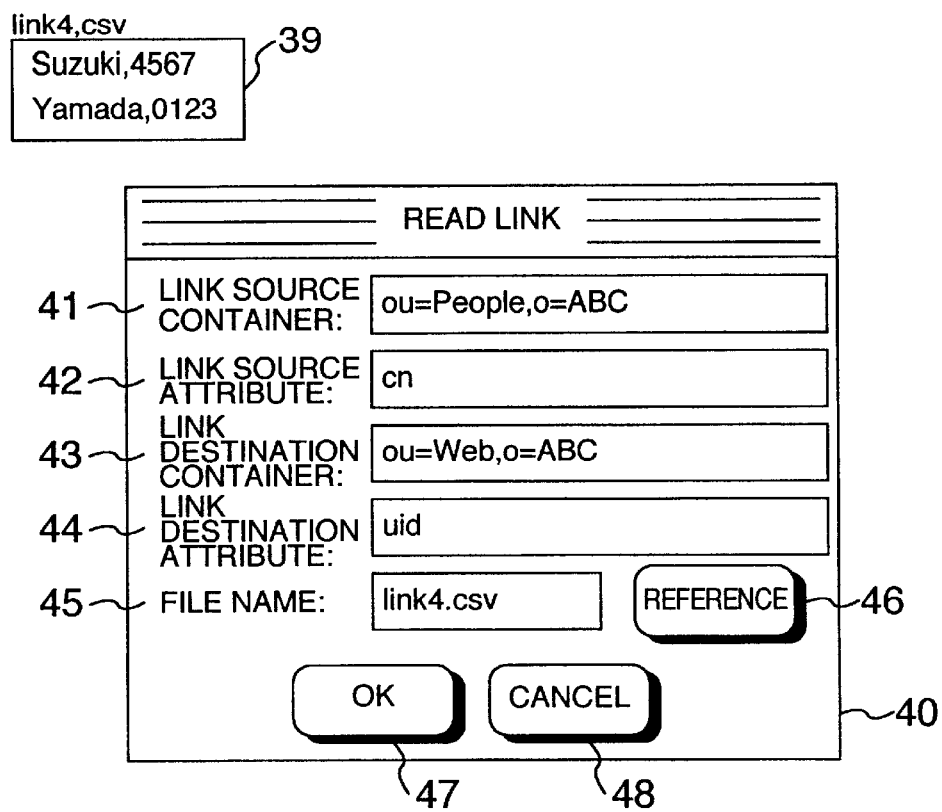
FIG. 9 is a diagram showing a link file format and a screen display example in an operation to generate links at a time.

FIG. 9 shows a screen display example used to generate all links at a time. This example is implemented by adding an area 42 to input a name of a link source attribute and an area 44 to input a name of a link destination attribute to screen 25 shown in FIG. 6. FIG. 9 further includes an example of link generating information table 6 in this embodiment. Table 6 includes values respectively of link source and destination attributes respectively in first and second lines.

When this embodiment is applied to the system, it is only necessary to modify steps S701 and S702 such that attribute names inputted to areas 42 and 44 are used without reading the first line of table 6.

In the embodiments above, the system manager inputs entry dn for each of the link source an destination containers. However, when these information items are kept in table 6, a similar advantageous effect can be naturally obtained.

Moreover, in the embodiments above, to implement link generating information, there is used a file of a data format such as the CSV format widely employed in applications available in the market. This however does not restrict the present invention. To attain a similar advantage, there may be naturally used a relational database (RDB), a database of an indexed sequential access method (ISAM) broadly used as a simplified database using a high-speed indexing technique, or a file of a spreadsheet application.

When the RDB is used, in place of the file above, to implement link generating information, it is only necessary that the link generating information determining section is replaced by a database access section to conduct search and update of the database by a structured query language (SQL) and the information storage format is changed in the specific read/write device for the link information holding device and in the link information holding device. As a result, a similar advantageous effect is attained without modifying the constituent components associated with the present invention.

In the meta-directory system of the prior art, as a method to mitigate the operation load to generate a large number of links, there has been known a method to search all entries corresponding to one entry at a time.

In this method, when the system manager selects one of the attributes of a specific entry, the system searches a common entry having an attribute value (to be called a key attribute) equal to an attribute value selected for each specific entry. Therefore, when the common entry and the specific entry have the same value, it is possible to establish links at a time. However, when these entries have different values, the links may not be established in some cases.

When data of an existing application in use is to be controlled by a meta-directory in a centralized control fashion, there is generally used method in which specific entries are generated according to a database of the existing application. Even when such a specific entry controls information semantically equal to information of a common entry, the specific entry and the common entry have not necessarily the same value. For example, even when the meta-directory system and the existing application control a name of a user, there may be a situation in which the meta-directory system subdivides the user name into a family name or surname and a given name to control these items using two fields and the existing application controls the name as one item in one field. For example, a common entry of a user includes a given name "Taro" and a surname "Yamada" and a specific entry includes a nickname "T.Yamada" generated by combining a first letter of "Taro" with the surname "Yamada".

Consequently, even when the nickname "T.Yamada" of the specific entry is set as a key attribute for a search through a group of common entries in the prior art, it is impossible to detect a common entry to be linked. Conversely, when the surname "Yamada" of the common entry is set as a key attribute for a search through a group of specific entries, not only "T.Yamada" but also entries with a value including "Yamada" such as "Y. Yamada" are disadvantageously searched.

As above, when links are generated at a time between common and specific entries according to the analogous technique, a necessary entry cannot be appropriately searched or many entries not correctly corresponding to the key attribute are searched. This requires a job to select appropriate entries therefrom and hence increases a load of link control operation.

Referring to FIGS. 10 to 13, description will be given of another embodiment including a function to generate all links at a time in consideration of the problem above. The description will be given primarily on difference between this embodiment and those described above. This embodiment and the embodiments above are equal in the functional and system configurations to each other.

Figure 10:
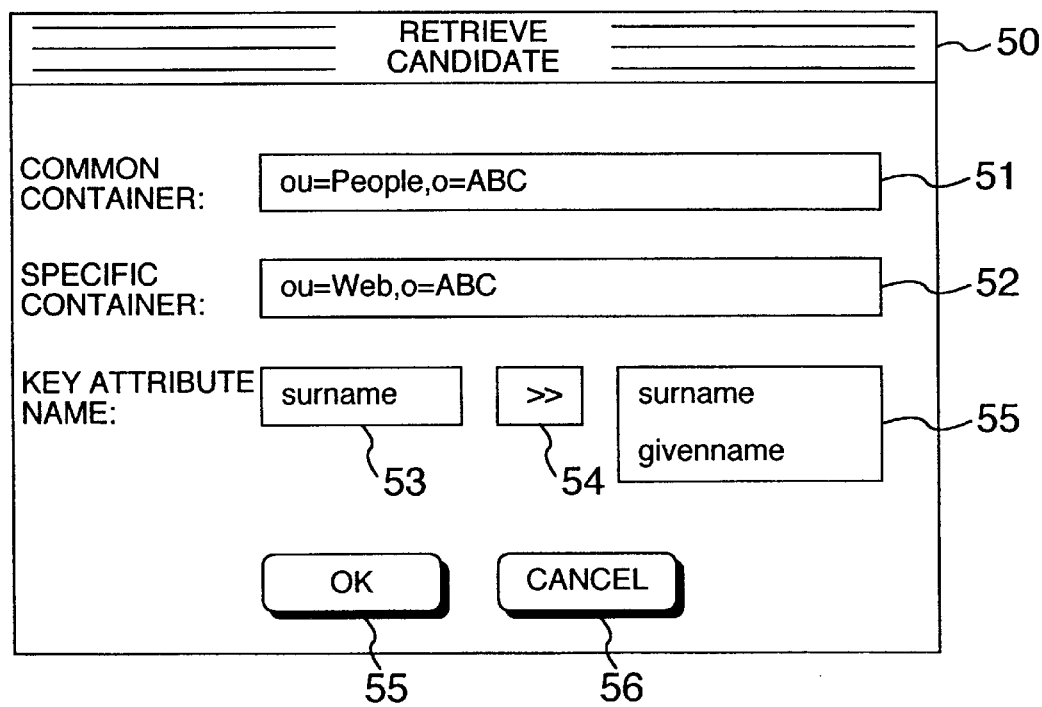
FIG. 10 is a diagram showing a screen display example to generate links in another embodiment of the present invention.

FIG. 10 shows a screen display example 50 employed to generate links at a time. The system manager sets necessary parameters using display 13, keyboard 14, mouse 15, and the like of client 1. Screen 50 includes an area 51 to input an identifier name of a common container, an area 52 to input an identifier name of a specific container, an area 53 to input a key attribute name, a button 54 to register the key attribute name inputted in area 53, an area 55 to display the key attribute name registered, a button 56 to indicate generation of all links at a time, and a button 57 to cancel the operation.

To register a key attribute name, the system manager inputs an attribute name of the common entry to area 53 and depresses button 54. The name registered is displayed in area 55. To instruct the generation of links at a time, the system manager inputs character strings in areas 51 to 53 using keyboard 14 or the like and clicks registration button 54 and OK button 56 using mouse 15.

Referring now to FIGS. 11 and 12, description will be given of a layout of data used by the function to generate links at a time in this embodiment.

FIG. 11 shows link generating information table 6 to define a correspondence between specific entries and attributes of an application supported by this embodiment. Table 6 includes a common entry attribute name 61, a specific entry attribute name 62, and a conversion rule 63. An attribute indicated by name 61 and an attribute indicated by name 62 can be converted into each other using conversion rule 63.

Table 6 includes in its first line a common entry and a conversion rule example used between specific entries below an identifier name "ou=Web, o=ABC" . Conversion rule 63 includes "InitChar (givenname)" indicating to acquire a first letter of the name. An addition sign "+" indicates that values before and after this sign are connected to each other. An equal sign "=" indicates that values before and after this sign are equal to each other. Therefore, the first line indicates that the nickname attribute (nickname) of the specific entry has a value equal to a value obtained by connecting the first letter of the attribute value of the name (givenname) of the common entry to the attribute value of the surname by a dot ".".

FIG. 12 shows a list 70 generated by the link controller 4 as a work area to generate links. List 70 holds an identifier name (dn) 71 of the specific entry and a conversion source key attribute value 72 paired with identifier name (dn) 71. Value 72 is an attribute value of an entry indicated by identifier name 71. Link generating information determining section 5 receives key attribute 72 and generates a key attribute to search a common entry corresponding to the pertinent entry.

Figure 13:
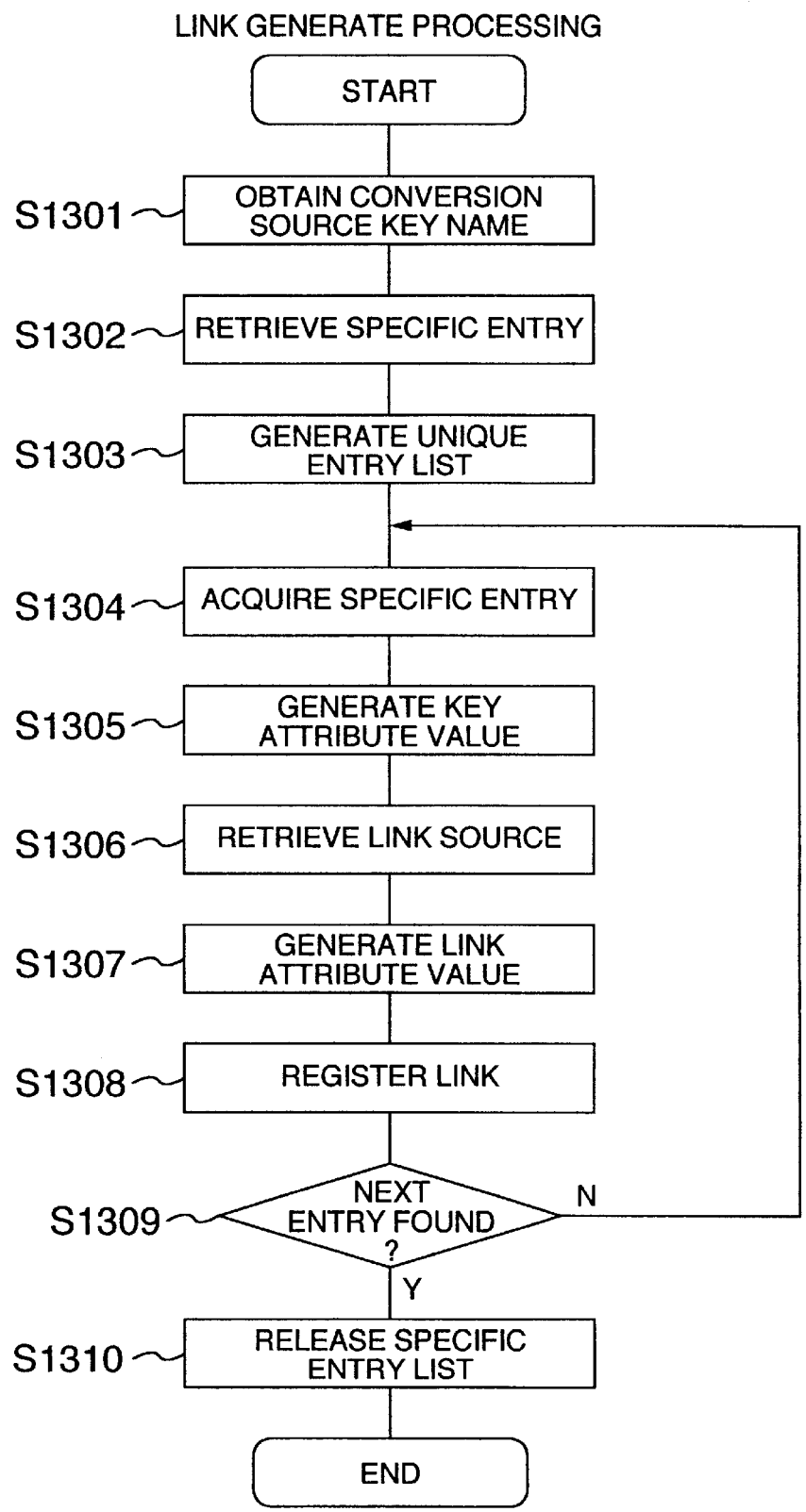
FIG. 13 is flowchart showing operation of a link controller in another embodiment.

Referring now to the flowchart of FIG. 13, description will be given of operation of link controller 4 to execute processing to general all links at a time in this embodiment.

In step S1301, when the system manager clicks OK button 56 on screen 50, link controller 4 acquires from link generating information table 6 a specific entry attribute name corresponding to a common entry attribute name specified as the key attribute name in area 55 and sets the attribute as a conversion source key attribute.

For entries below the entry specified in area 52, link controller 4 generates a directory search request with a search condition that an objectclass attribute has a value of character string "webUser" indicating a specific entry of the application of the embodiment. Controller 4 issues the request to server 2.

In step S1302, server 2 having received the directory search request analyzes the request to search an entry satisfying the search range and the condition. Server 2 returns an identifier name (dn) of the detected entry and the conversion source key attribute value to client 1.

In step S1303, link controller 4 having received the search result from server 2 once stores the identifier name and the conversion source key attribute value in list 70 on the memory.

In step S1304, link controller 4 obtains identifier name 71 and conversion source key attribute value 72 for one entry beginning at a first point of list 70.

In step S1305, link generating information determining section 5 having received conversion source key attribute value 72 generates a key attribute value for a common entry.

For example, when the conversion source key attribute name is a nickname attribute, section 5 accesses link generating information table 6 shown in FIG. 11 to acquire therefrom conversion rule 63 in a line containing common attribute name 61 matching the conversion source key attribute name. Section 5 processes the conversion source key attribute value according to the conversion rule to generate a key attribute value.

For entries below the entry specified in area 51, link controller 4 generates a directory search request with a search condition that an objective item has the key attribute value generated above. Controller 4 issues the directory search request to server 2.

In step S1306, server 2 having received the directory search request analyzes the request to search an entry satisfying the search range and condition. Server 2 returns an identifier name (dn) of the detected entry to client 1.

In step S1307, link controller 4 having received the search result from server 2 generates an attribute (a member attribute, a link attribute, and the like) for a link using identifier name 71 obtained from list 70.

In step 1308, link controller 4 generates an entry update request to add the attribute to the entry received in step S1307. Controller 4 issues the request to server 2.

In steps S1309 and S1310, link controller 4 repeatedly execute steps S1304 to S1308 up to an end of list 70. When control reaches the end of list 70, controller 4 releases list 70 and terminates the processing.

In step S1306, when a plurality of entries are returned as search results from serve 2, links may be registered to a plurality of link source entries. Alternatively, the entries may be displayed on the screen such that the system manager to select one of the entries.

The operation of link generating information determining section 5 will be more specifically described by referring to the example of FIG. 4.

When a surname and a given name are inputted as a key attribute name in screen 50 of FIG. 10, section 5 accesses link generating information table 6 to acquire therefrom a conversion rule to generate the surname and the given name.

Table 6 includes conversion rule 63 in its first line. Rule 63 indicates that the nickname attribute value includes a first letter of the given name immediately before a dot "." and the surname after the dot ".". Consequently, to search a common entry corresponding to specific entry 20 indicated by identifier name "uid=0123, ou=Web, o=ABC", a nickname attribute value of "T. Yamada" is supplied as the conversion source key attribute to link generating information determining section 5. Therefore, section 5 extracts a letter immediately before the dot "." from the character string to set the letter as the first letter of the given name. Section 5 extracts therefrom the partial character string after the dot "." as the surname. Section 5 returns the first letter of the given name and the surname to link controller 4.

According to the data from section 5, link controller 4 searches a link source with a condition that the given name includes "T" as its first letter and the surname is "Yamada". Resultantly, controller 4 obtains common entry 18 indicated by identifier name "cn=Yamada, ou=People, o=ABC".

In this situation, even when an entry having the same surname "Yamada" exists in the search range of server 2, the entry is not searched if the first letter of its given name is other than "T". Namely, when compared with the prior art, the entry for the link can be searched with higher precision according to the present invention.

By executing the processing above for all specific entries, it is possible to automatically generate a key attribute value to search a common entry corresponding to respective specific entries.

For this embodiment, description has been given of an example of processing of link generating information determining section 5 to convert an attribute value. However, the processing specifically depends on a schema of common and specific entries. Therefore, for each meta-directory system, it will be required to prepare processing depending on each schema definition.

According to the present invention described above, the system manager need not set a link for each user information in the system installation and operation.

In a meta-directory, when entries are related to each other by links, attribute values corresponding to the entries are also synchronized. The mapping processing section and the attribute mapping table of the present invention may also be commonly used by a function used to synchronize the attribute values.

According to a database system of the present invention, by providing a link generating information determining section to generate, using an attribute value of a first record, an attribute value of a second record corresponding the first record, the system manager can set links between a large amount of entries at a time without setting a link for each record and without inputting complex conversion rules.

In a database link control method according to the present invention, it is possible to remarkably reduce the load of management of the system in the system installation and operation.

While the present invention has been described in detail and pictorially in the accompanying drawings, it is not limited to such details since many changes and modifications recognizable to those of ordinary skill in the art may be made to the invention without departing from the spirit and scope thereof.

We claim:

1. A database system, comprising:
a database server including a storage section for storing information regarding a plurality of records and a holding section for storing a link to relate records to each other; and
a database client, wherein the database client comprises:
a link generating information table,
wherein said link generating information table receives as an input thereto an attribute value of an arbitrary record and holds at least one link generating information item to generate a link between records,
wherein the database client further comprises:
a link controller for reading a link generating information item registered to the link generating information table, generating at least one link between records, and registering the at least one link to the database server, and
wherein the database server receives registration of the at least one link generated by the database client and stores the at least one link in the holding section.

2. A database system according to claim 1, wherein said link controller comprises:
a read section for reading a link generating information item registered to the link generating information table;
a search section for searching a link source record and a link destination record, which are associated with the link generating information item thus read, from at least one record stored in the database server; and
an adder section for adding a link to the link source record stored in the server, the link indicating the link destination record.

3. A database system according to claim 2, wherein said link controller of the database client includes a processing section for reading at least one link registered to the database server and for storing the link in the holding section.

4. A database system according to claim 3, wherein the link generating information item includes a combination of an attribute value of a link source record and an attribute value of a link destination record.

5. A database system according to claim 4, wherein the link generating information item includes a rule to generate either one of the link source attribute value and the link destination record attribute value according to the other one thereof.

6. A database system according to claim 5, wherein the link includes information to specifically identify another record.

7. A database client for use in a database system including a database server including a storage section for storing information regarding at least one record and a holding section for storing a link to relate records to each other, said database client comprising:
a link generating information table,
wherein said link generating information table receives as an input thereto an attribute value of an arbitrary record and holds at least one link generating information item to generate a link relating records to each other; and
a link controller for reading a link generating information item registered to said link generating information table, generating at least one link between records, and registering the at least one link to the database server.

8. A database client according to claim 7, wherein said link controller comprises:
a read section for reading a link generating information item registered to said link generating information table;
a search section for searching a link source record and a link destination record, which are associated with the link generating information item thus read, from at least one record stored in the database server; and
an adder section for adding a link to the link source record stored in the database server, the link indicating the link destination record.

9. A database client according to claim 8, wherein said link controller further comprises:
a storage section for reading at least one link registered to the database server and for storing the at least one link in the link generating information table.

10. A database client according to claim 9, wherein the link generating information item includes a combination of an attribute value of a link source record and an attribute value of a link destination record.

11. A database client according to claim 10, wherein the link generating information item includes a rule to generate either one of the link source attribute value and the link destination record attribute value according to the other one thereof.

12. A database client according to claim 11, wherein the link includes information to specifically identify another record.

13. A database server for use in a database system including the database server and a database client, said database server comprising:
a first storage section for storing information regarding a plurality of records;
a second storage section for storing a link to relate records to each other;
a section for receiving and for storing registration of a link between a plurality of records, the link being generated by the database client according to a link generating information item stored in a link generating information table held by the database client to generate a link between records,
wherein said link generating information table receives as an input thereto an attribute value of an arbitrary record and holds at least one link generating information item to generate a link between records,
wherein the database client comprises:
a link controller for reading a link generating information item registered to the link generating information table, generating at least one link between records, and registering the at least one link to the database server, and
wherein the database server receives registration of the at least one link generated by the database client and stores the at least one link in the holding section.

14. A program product for implementing on a computer a database client for use in a database system including the database client and a database server having a storage section for storing information regarding at least one record and a holding section for storing a link to relate records to each other, comprising:
a code for receiving as an input thereto an attribute value of an arbitrary record and making a link generating information table disposed in a storage of the computer for holding at least one link generating information item to generate a link relating records to each other;

a code for reading a link generating information item from the link generating information table registered to the storage;

a code for generating at least one link between records;

a code for registering the link to the database server;

wherein the database client comprises:

a link controller for reading a link generating information item registered to the link generating information table, generating at least one link between records, and registering the at least one link to the database server, and wherein the database server receives registration of the at least one link generated by the database client and stores the at least one link in the holding section; and a storage media for storing the codes.

15. A program product according to claim 14, further including:

a code for reading link generating information registered to the link generating information table;

a code for searching a link source record and a link destination record, which are associated with the link generating information thus read, from at least one record stored in the database server; and a code for adding a link to the link source record stored in the server, the link indicating the link destination record.

16. A program product according to claim 15, further including a code for reading at least one link registered to the server and for storing the link in the link generating information table.

\* \* \* \* \*